US009055025B2

(12) United States Patent  (10) Patent No.: US 9,055,025 B2
Patenaude et al.  (45) Date of Patent: Jun. 9, 2015

(54) CELLULAR DEVICE IDENTIFIER PROVISIONING VERIFICATION

(71) Applicant: General Motors LLC and GM Global Technology Operations LLC, Detroit, MI (US)

(72) Inventors: Russell A. Patenaude, MaComb Township, MI (US); James E. Bicego, Jr., Utica, MI (US); David A. Holt, Rochester Hills, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 237 days.

(21) Appl. No.: 13/712,438

(22) Filed: Dec. 12, 2012

(65) Prior Publication Data

US 2014/0162639 A1  Jun. 12, 2014

(51) Int. Cl.
| | |
|---|---|
| H04M 1/66 | (2006.01) |
| H04L 29/12 | (2006.01) |
| H04L 29/08 | (2006.01) |
| H04L 12/24 | (2006.01) |
| H04W 4/00 | (2009.01) |
| H04W 4/04 | (2009.01) |

(52) U.S. Cl.
CPC ............... *H04L 61/00* (2013.01); *H04L 67/30* (2013.01); *H04W 4/001* (2013.01); *H04W 4/046* (2013.01); *H04L 41/00* (2013.01); *H04L 41/0853* (2013.01); *H04L 41/0873* (2013.01)

(58) Field of Classification Search
CPC ........... H04W 8/04; H04W 8/06; H04W 4/24; H04W 8/00; H04W 12/08
USPC ............... 455/406, 407, 408, 410, 411, 435.1
See application file for complete search history.

(56) References Cited

U.S. PATENT DOCUMENTS

| 6,571,093 | B1 * | 5/2003 | Jarrett, Jr. ...................... 455/408 |
| 7,787,864 | B2 * | 8/2010 | Provo ............................. 455/411 |
| 2005/0107132 | A1 * | 5/2005 | Kamdar et al. ............. 455/569.2 |
| 2008/0207220 | A1 * | 8/2008 | Aaron ......................... 455/456.1 |
| 2009/0254479 | A1 * | 10/2009 | Pharris ............................. 705/42 |
| 2010/0153249 | A1 * | 6/2010 | Yuan et al. ....................... 705/34 |
| 2010/0245122 | A1 * | 9/2010 | Haralson et al. .......... 340/870.16 |
| 2010/0291912 | A1 * | 11/2010 | Tafarrodi et al. ............. 455/419 |
| 2010/0311391 | A1 * | 12/2010 | Siu et al. ....................... 455/411 |
| 2011/0098030 | A1 * | 4/2011 | Luoma .......................... 455/419 |
| 2011/0294466 | A1 * | 12/2011 | Tang et al. .................... 455/411 |
| 2012/0203594 | A1 * | 8/2012 | Groer et al. .................. 705/7.29 |
| 2012/0289210 | A1 * | 11/2012 | Choi et al. .................. 455/414.1 |
| 2013/0225123 | A1 * | 8/2013 | Adjakple et al. .............. 455/406 |
| 2014/0066047 | A1 * | 3/2014 | Qiang ........................... 455/419 |
| 2014/0109187 | A1 * | 4/2014 | Rados .............................. 726/4 |

* cited by examiner

*Primary Examiner* — Christopher M Brandt
(74) *Attorney, Agent, or Firm* — Leydig, Voit & Mayer, Ltd.

(57) ABSTRACT

Systems and methods are described for confirming the accuracy and consistency of cellular device provisioning parameters such as telematics station identifiers (TSTIDs) stored at multiple locations. One implementation consists of a method for ensuring accuracy and consistency of parameters stored at multiple locations. The method involves storing parameters on a computer readable medium, connecting to a mobile station corresponding to a first stored parameter, and requesting the mobile station with which a connection has been established report parameters stored at the mobile station. The method further involves establishing an API call with a carrier network operator who provides services to the mobile station, transmitting a second stored parameter to the carrier network operator and requesting the carrier network operator report parameters corresponding to the second stored parameter. The method then compares the parameters received from the mobile station with the parameters received from the carrier network operator.

20 Claims, 5 Drawing Sheets

CELLULAR DEVICE IDENTIFIER PROVISIONING VERIFICATION

FIELD

The present disclosure relates generally to telematics systems and more particularly to connectivity between telematics service providers and the cellular devices through which services are provided.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide a subscriber with an array of telematics services such as those described herein.

The process of provisioning and activating a telematics unit involves the acquisition and registration by the service provider of unique identifiers associated with a particular telematics unit which are stored on a chip or memory card integrated into that telematics unit. Additionally, if the subscriber wishes to link additional mobile devices to the TSP, the provider must acquire and register the unique identifiers for those linked devices. For example, a subscriber may wish to link a smart phone or tablet to the account in order to receive services through such mobile devices. The provisioning and activating processes may need to be repeated if a telematics equipped vehicle is sold to a new purchaser, if the subscriber replaces a previously linked mobile device, if the subscriber acquires a new mobile device and wishes to link it to the telematics services, if the subscriber changes mobile providers for one of his devices, etc.

Methods for maintaining correct identifiers for subscriber devices and for updating subscriber device identifiers help TSPs to ensure that services may be provided to subscribers efficiently and effectively when they are requested. Errors in the device identification information maintained by the service provider may prevent the service provider from contacting and providing services, which may be designed to avert or minimize the consequences of emergency situations, to subscribers.

BRIEF SUMMARY

Systems and methods are described herein for confirming the accuracy and consistency of mobile device provisioning parameters, such as a telematics station identifier (TSTID), stored at multiple locations.

A method is described for ensuring accuracy and consistency of mobile station provisioning and activation parameters stored at multiple locations comprising storing parameters on a computer readable medium, connecting to a mobile station corresponding to a first stored parameter, requesting the mobile station with which a connection has been established report parameters stored at the mobile station, receiving parameters from the mobile station, establishing an API call with a carrier network operator who provides services to the mobile station, transmitting a second stored parameter to the carrier network operator and requesting the carrier network operator report parameters corresponding to the second stored parameter, receiving parameters from the carrier network operator, and comparing the parameters received from the mobile station with the parameters received from the carrier network operator.

A method is described for ensuring accuracy and consistency of mobile station provisioning and activation parameters stored at multiple locations comprising receiving a call from a mobile station, requesting provisioning and activation parameters stored at the calling mobile station from the calling mobile station, receiving parameters from the calling mobile station, identifying a subscriber entry stored in a database corresponding to one or more of the parameters received from the mobile station, establishing a secondary connection with a second mobile station corresponding to one or more parameters contained in the identified subscriber entry, requesting parameters from the second mobile station, receiving parameters from the second mobile station, and comparing the parameters received from the calling mobile station with the parameters received from the second mobile station, wherein the calling mobile station and the second mobile station may be the same mobile station.

A method is described for confirming the accuracy and consistency of mobile station provisioning and activation parameters stored at multiple locations comprising receiving a call from a mobile station, requesting provisioning and activation parameters stored at the calling mobile station from the calling mobile station, receiving parameters from the calling mobile station, identifying a subscriber entry stored in a database corresponding to one or more of the parameters received from the mobile station, transmitting information stored in the identified subscriber entry to a third party service provider, requesting that the third party service provider identify a mobile device corresponding to the transmitted information and return characteristics of the identified mobile device, receiving characteristics of the identified mobile device from the third party service provider, and comparing characteristics received from the third party service provider with characteristics of the calling mobile station.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Before discussing the details of the invention and the environment wherein the invention may be used, a brief overview is given to guide the reader. In general terms, a system and method are described herein for provisioning identifiers for cellular devices utilized by telematics service providers. It will be appreciated that the principles described herein are applicable to apparatuses capable of sending information to, receiving information from, or both sending information to and receiving information from a telematics service provider (TSP). In addition to a telematics unit integrated into a vehicle, exemplary systems are also equipped to include mobile wireless communication devices capable of communicating with a TSP via mobile wireless communications, e.g. smart phones, tablet computers, laptop computers, etc.

Figure 1:
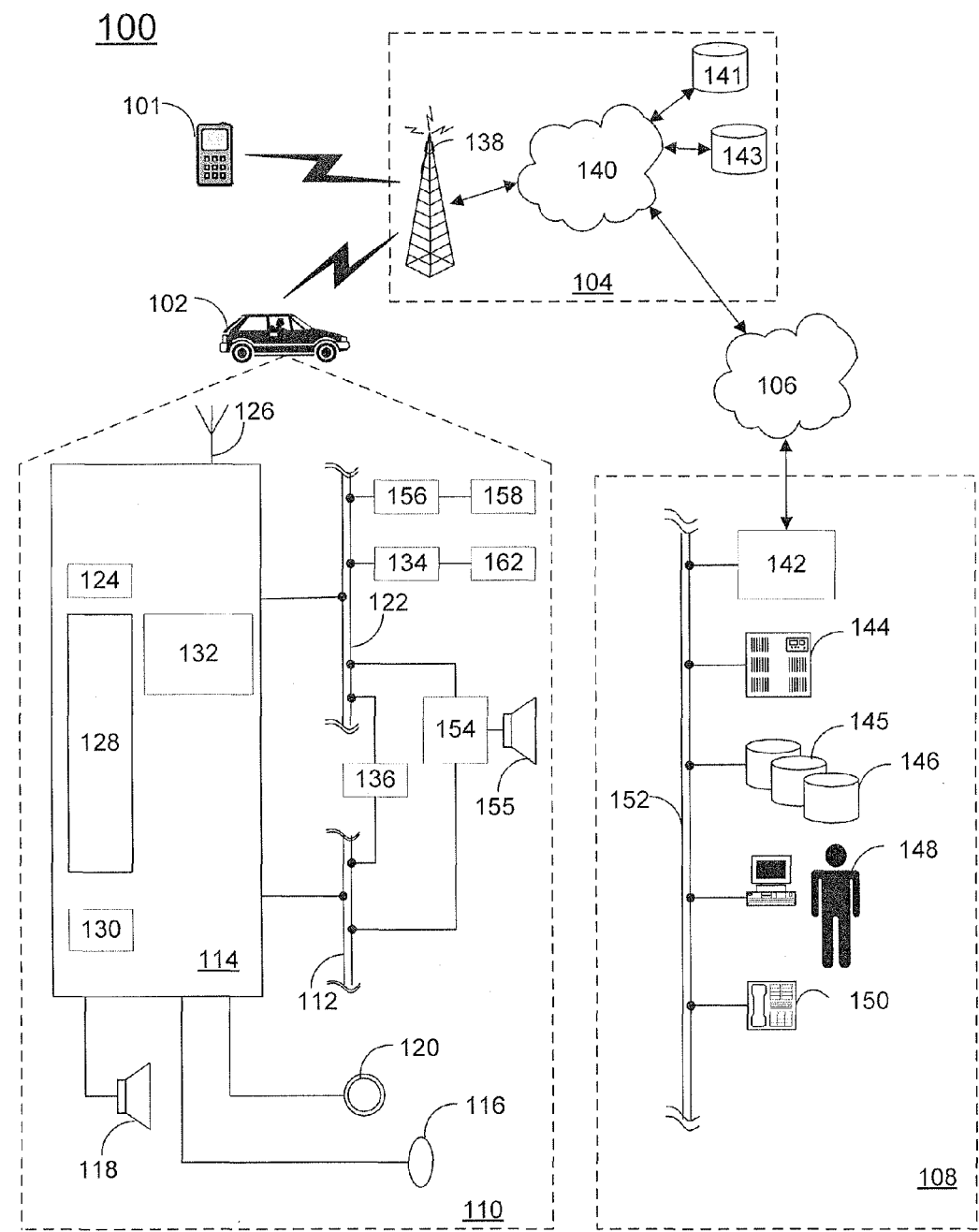
FIG. 1 is a schematic diagram of an operating environment for a mobile vehicle communication system usable in implementations of the described principles.

In general, the illustrative examples described herein pertain to facilitating the provisioning of identifiers for various devices used by subscribers to receive telematics services from TSP. An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes a subscriber database 145 that stores a variety of subscriber information including mobile device provisioning parameters (hereinafter "parameters"). The parameters may include but are not limited to one or more of integrated circuit card identifiers (ICCIDs) corresponding to subscribers' subscriber identity modules (SIMs), international mobile equipment identities (IMEIs) corresponding to network access devices (NADs) integrated into subscribers' mobile equipment, mobile identification numbers (MINs), electronic serial numbers (ESNs), mobile equipment identifiers (MEIDs), international mobile subscriber identities (IMSIs) associated with subscribers' SIM cards, mobile device numbers (MDNs) used to dial a specific mobile device, mobile station international subscriber directory numbers (MSISDNs) associated with each subscriber, service set identifiers (SSIDs), media access control (MAC) addresses, and internet protocol (IP) addresses. Thus, the following paragraphs provide a brief overview of an exemplary communication system 100. However, other systems are contemplated that are capable of incorporating the described database and processor functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126, and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component 132 and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

Vehicle communications use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The mobile wireless network system 104 is, for example, a cellular telephone network system or any other suitable wireless system that transmits signals between mobile wireless devices, such as the telematics unit 114 of the vehicle 102 or an alternative mobile device 101, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. One of ordinary skill in the art will appreciate that FIG. 1 is merely an illustrative example and that the present invention may be practiced in an environment where a wireless network system, such as that depicted by element 104, may contain other elements in addition to or in the alternative to those explicitly depicted in FIG. 1. For example, the wireless network system may include components such as an IP multimedia subsystem, a serving gateway, an evolved node B, and other components which one of ordinary skill in the art would appreciate are found in 2G, 3G, LTE, GSM, or other types of mobile networks.

The MSC 140 routes voice calls, data calls, and other services to and from the telematics unit 114 and the mobile device 101. The MSC 140 also handles call setup and basic switching functions and interfaces with other MSCs in order to coordinate inter-MSC handoffs. A home location register (HLR) 141 is a database which may be connected to the MSC 140. The HLR 141 stores a variety of subscriber information including an International Mobile Subscriber Identity (IMSI) and a mobile phone number corresponding to each subscriber, i.e. a Mobile Station International Subscriber Directory Number (MSISDN). An Equipment Identity Register (EIR) 143 is another database which may be connected to the MSC 140. The EIR 143 stores information pertaining to the individual mobile stations on a network including the International Mobile Equipment Identity (IMEI). One of ordinary skill in the art will appreciate that the HLR 141 and EIR 143 may also store a variety of other types of subscriber information including but not limited to mobile identification numbers (MINs), electronic serial numbers (ESNs), mobile equipment identifiers (MEIDs), mobile device numbers (MDNs) used to dial a specific mobile device, service set identifiers (SSIDs), media access control (MAC) addresses, and internet protocol (IP) addresses.

As appreciated by those skilled in the art, the mobile wireless network system includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 may include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof. Although the network connecting the wireless network system 104 to the communications center 108 is a land network in FIG. 1, one of skill in the art will understand that it is possible for the communications center 108 to be connected to the wireless network system 104 without a land network.

The communications center 108 is configured to provide a variety of back-end services and application functionality to the hardware 110. The communications center 108 includes, by way of example, network switches 142, servers 144, databases 146 (including subscriber database 145), live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. At least one database is a subscriber database 145. The subscriber database contains a variety of information pertaining to the subscribers of a telematics service provider, for example the specific services the subscriber is entitled to receive and billing rates for such services. Additionally, the subscriber database may include mobile parameters corresponding to the mobile devices linked to the subscriber's account including ICCIDs corresponding to subscribers' SIMs, IMEIs corresponding to NADs integrated into subscribers' mobile equipment, IMSIs associated with subscribers' SIM cards, and MSISDNs associated with each subscriber. Furthermore, the subscriber database may include other parameters such as MINs, ESNs, MEIDs, MDNs, SSIDs, MAC addresses, and IP addresses. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 2:
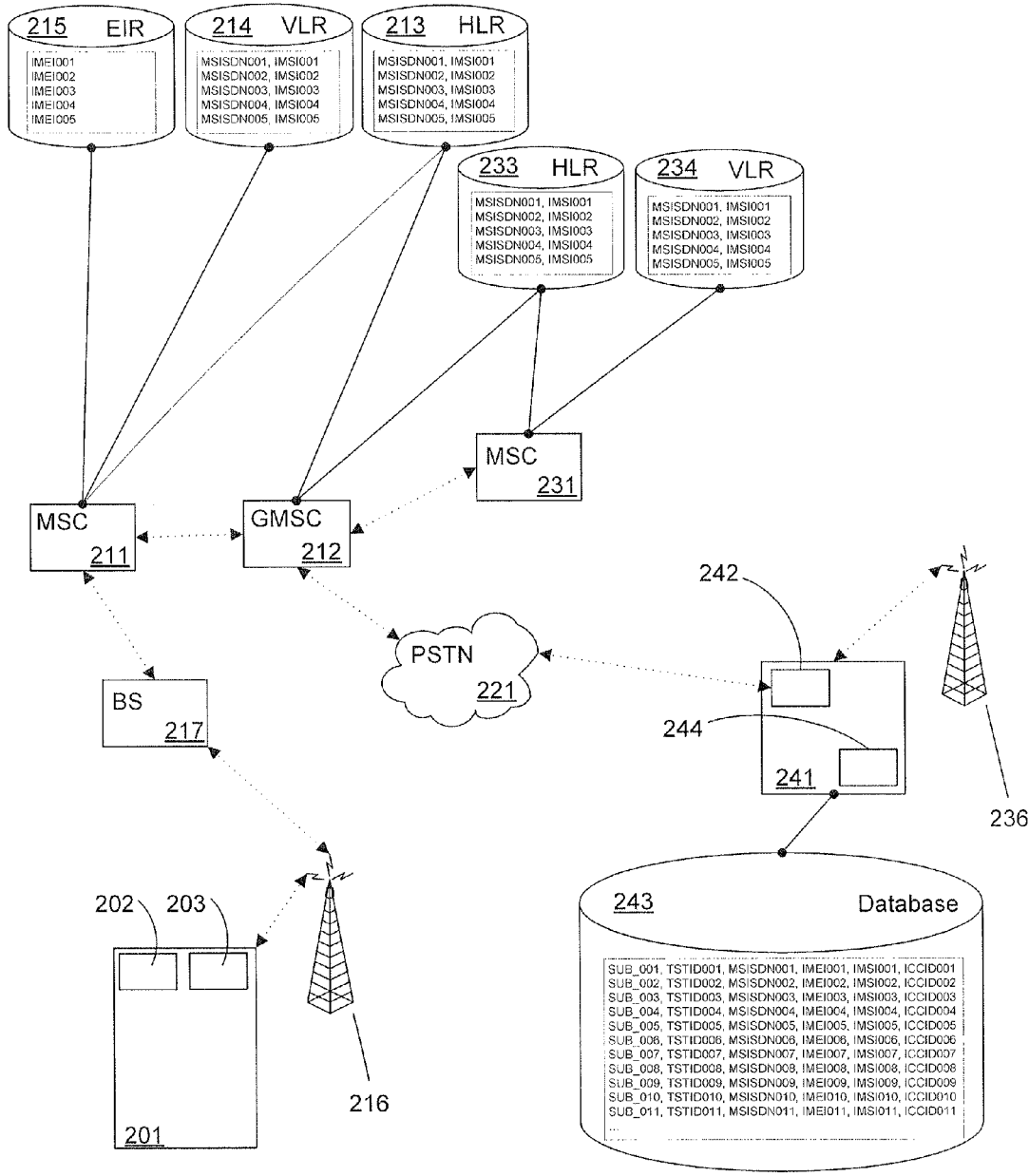
FIG. 2 is a schematic diagram of an exemplary environment in which the accuracy and consistency of information stored in a mobile station and at multiple databases may be confirmed.

With further reference to the architecture of FIG. 1, and turning more specifically to FIG. 2, a set of functional components are depicted that provide an exemplary environment in which features of the present invention may be implemented. A subset of the depicted components in FIG. 2 correspond to a subset of the components depicted in FIG. 1. For example, the telematics unit 114 and the mobile device 101, which are depicted in FIG. 1, are examples of a mobile station 201, which is depicted in FIG. 2. Similarly, the MSC 140, which is depicted in FIG. 1, corresponds to the MSC 211, which is depicted in FIG. 2. One of skill in the art will understand that FIGS. 1 and 2 are merely exemplary environments in which the systems and processes of the present invention may be implemented and that certain examples of the present invention may not utilize each and every component depicted in FIGS. 1 and 2. Similarly, one of skill in the art will recognize that FIGS. 1 and 2 are merely illustrative of the environs in which the present invention may be implemented and do not contain an exhaustive set of the components utilized by all examples of the present invention.

FIG. 2 depicts a mobile station 201 that may both receive incoming calls from a communications center 241 and send information to the communication center 241. Mobile station 201 includes a SIM card 202 and a NAD 203. The SIM card 202, which may be either insertable or embedded, may have a unique ICCID which is used to identify the SIM card 202. Alternatively, the SIM card 202 may have multiple ICCIDs, each of which may be associated with a subscription or profile resident on the SIM. In the event that SIM card 202 has multiple ICCIDs, a primary ICCID may be associated with a single subscription or profile that is permanently resident on the SIM card 202. The mobile station 201 may be a telematics unit such as the one exemplified by element 114 of FIG. 1. Alternatively, the mobile station 201 may be any variety of devices capable of receiving and/or transmitting information through a cellular tower 216 over a mobile wireless network system such as that depicted by element 104 in FIG. 1. Such mobile devices include but are not limited to cellular phones, PDAs, smart phones, tablet computers, and notebook computers. The mobile station 201 is connected to a mobile switching center (MSC) 211 through a combination of a cellular tower 216 and a base station 217. The mobile wireless network system includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements. Furthermore, one of ordinary skill in the art will appreciate that the wireless network system may include components, in addition to or in the alternative to those explicitly depicted in FIG. 2, such as an IP multimedia subsystem, a serving gateway, an evolved node B, and other components which one of ordinary skill in the art would appreciate are found in 2G, 3G, LTE, GSM, and other types of mobile networks. For example, the mobile wireless network system may include a general packet radio service (GPRS) network that handles routing and transportation of data packets across the network through serving GPRS support nodes (SGSNs) and gateway GPRS support nodes (GGSNs).

The MSC 211 routes voice calls, data calls, and other services to and from the mobile station 201. The MSC 211 also handles call setup and basic switching functions and interfaces with other MSCs in order to coordinate inter-MSC handoffs. The MSC 211 is connected to multiple databases including a home location register (HLR) 213 and a visitor location register (VLR) 214. The HLR 213, which is maintained by a carrier network operator, stores a variety of information pertaining to subscribers including but not limited to the subscriber-specific MSISDN and IMSI and other parameters, the current location of the subscriber's mobile station, subscriber roaming restrictions, and a list of features to which the subscriber has access. The information stored in the HLR may further include details of each SIM card, such as the one depicted by element 202, issued by the carrier network operator. Such information may include the IMSI, which may serve as a primary key for each HLR record. The information stored in the HLR allows the carrier network to assign an MSC to each subscriber as the subscriber moves from the area serviced by one MSC to the area serviced by another MSC, to allow content to be delivered to a device across multiple MSCs, and to update the VLRs associated with other MSCs in the network such as MSC 231. The VLR 214 stores the same types of information stored on the HLR but only stores information for subscribers who have roamed into the area serviced by the MSC 211 instead of information for subscribers who are home to the area serviced by the MSC 211. Thus, the VLR 214 contains a subset of the information stored on the set of HLRs associated with the other MSCs in the network, such as HLR 233 and MSC 231. The data stored in the VLR 214 may be obtained directly from the other HLRs in the network, such as HLR 233, or from the mobile station 201. The MSC 211 is further connected to an equipment identity register (EIR) 215. The EIR 215 stores mobile equipment information such as the IMEI which allows the carrier network to identify the mobile equipment owned and operated by each subscriber.

The MSC 211 is also connected to a gateway mobile switching center (GMSC) 212 that routes voice calls, data calls, and other services between networks served by different MSCs. The GMSC 212 may also route calls which are made through the public switched telephone network (PSTN) 221. The GMSC 212 is also connected to the HLR 213. One of ordinary skill in the art will understand that FIG. 2 is merely one exemplary environment in which the present invention may be practiced and that the invention may be practiced in an environment in which the PSTN 221 is absent or where both the communications center 241 and the mobile station 201 are served by the same MSC.

FIG. 2 depicts an environment in which the mobile station 201 and the communications center 241 are connected through the PSTN 221. The communications center 241 comprises a switch 242 that routes incoming calls to the communications center 241 and outgoing calls from the communications center 241. The communications center 241 is connected directly to the PSTN 221 through the switch 242. Alternatively, the communications center 241 may be connected to the PSTN 221 through a mobile wireless network. For example, the switch 242 may be connected to one or more cellular towers and base stations which are connected to an MSC that is connected to the PSTN 221 by a GMSC.

The communications center 241 is connected to a database 243 that stores a variety of information pertaining to the subscribers of the telematics service provider's subscribers. Alternatively, the database 243 may be a component integrated into the communications center 241. The database 243 may store much of the same information stored in the HLRs, VLRs, and EIRs of the carrier network. In addition, the database 243 stores a telematics station identifier (TSTID), which is a unique number assigned by the TSP to every telematics enabled mobile device through which the TSP may provide services to subscribers.

The database 243 stores information for subscribers and mobile stations that are serviced by multiple carrier networks. For example, a subscriber of a TSP may use one particular carrier network operator to have telematics services delivered to a mobile device while a different subscriber may use a different carrier network operator to deliver telematics services. In another scenario, a telematics subscriber may purchase telematics services and have such services delivered to multiple mobile devices where different carrier networks deliver the services to the different devices, i.e. the subscriber may receive services from one carrier network on one particular device and receive services from a different carrier network on a different device. In such case, the database 243 would store information pertaining to each of the subscriber's multiple devices.

The database 243 provides the information necessary for the TSP to contact subscribers and to provide services to those subscribers. However, if any of the information stored on database 243 was recorded incorrectly at an initial configuration, or if information stored on database 243 becomes outdated, or stale, the TSP will be unable to provide telematics services to a subscriber whose records are incorrect. In light of the emergency nature of many of the services provided by a TSP, the database 243 accurately records information during initial configuration of telematics devices and is updated at regular periodic intervals in order to remove inaccurate old information and thereby maintain accurate current contact information for all subscribers. In order to update the information stored on the database 243, the communications center contains at least one processor 244 that may be configured with computer executable instructions to automatically acquire information regarding the mobile device provisioning parameters of the mobile devices used by subscribers and to automatically update the database 243 based on the acquired information.

Figure 3:
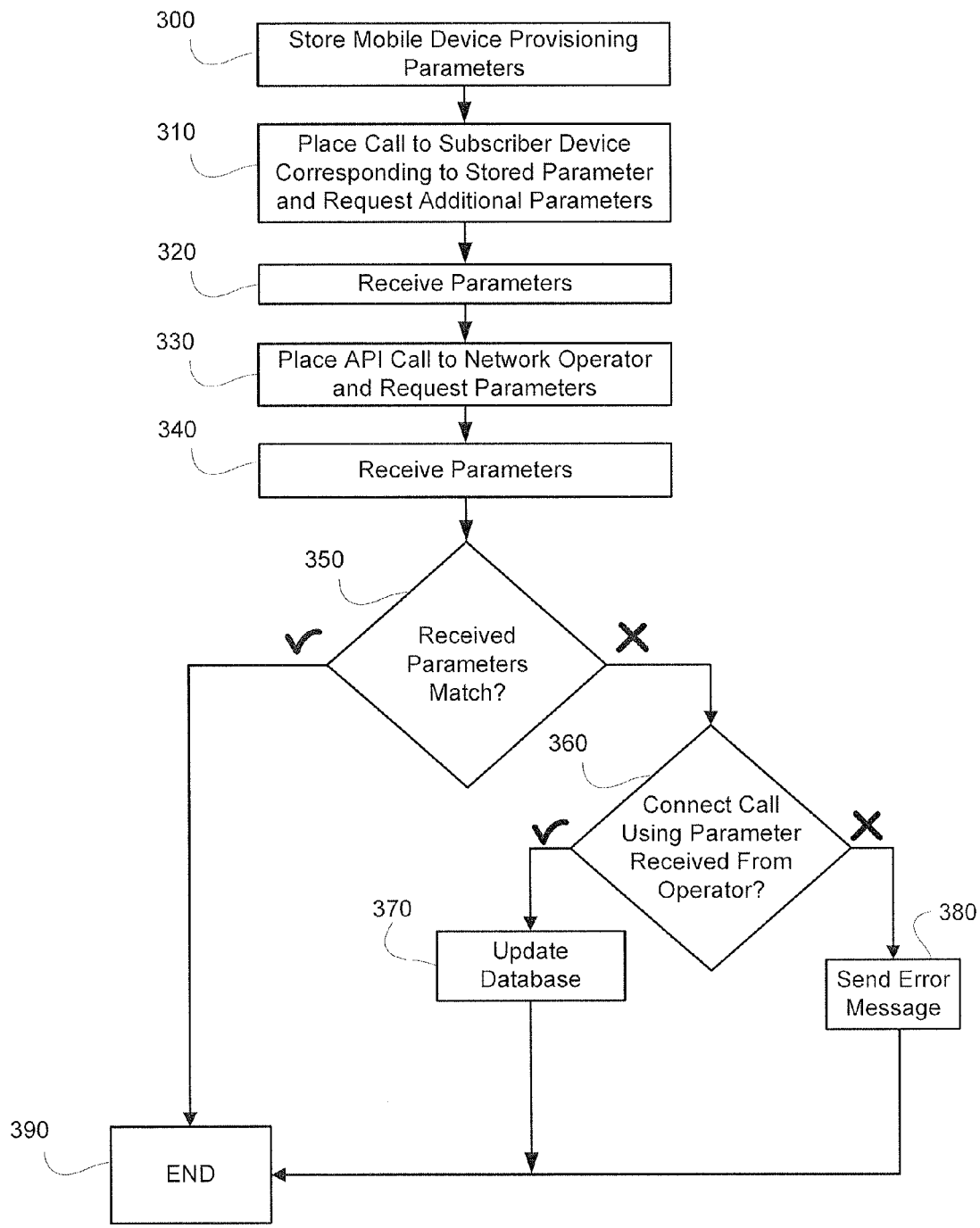
FIG. 3 is a flowchart illustrating a process for confirming the accuracy of parameters stored on one or more databases and at a mobile station.

FIG. 3 is a flowchart summarizing an exemplary process for maintaining telematics subscriber contact information for use by the TSP. During step 300, parameters, such as the TSTID, MDN, MSISDN, IMEI, IMSI, MIN, MEID, ESN, ICCID, SSID, MAC address, and IP address of a subscriber are stored on a computer readable medium. For example, the computer readable medium may be the database 243 of FIG. 2 or the subscriber database 145 of the databases 146 of FIG. 1. During step 310, a call is placed by a TSP to a subscriber device according to one of the parameters stored in the database at step 300 and requests are made by TSP to obtain the TSTID and, if desired, one or more additional parameters from the subscriber device to which the call was placed. During step 320, the TSTID and other parameters, such as the MSISDN, IMEI, IMSI, ICCID, etc., of the subscriber device to which the call was placed are returned to the TSP, who receives the parameters. During step 330, an API call, which includes one or more of the parameters stored at step 300, is made by the TSP to a carrier network operator and requests are made to obtain, from the carrier network operator, parameters stored by the carrier network operator that correspond to the one or more parameters stored at step 300 and transmitted in the API call. At step 340, the TSP receives parameters stored by the carrier network operator. At step 350, the TSP compares the parameters received from the subscriber device in step 320 and the parameters received from the carrier network operator at step 340. If, at step 350, it is determined that the parameters received during step 320 correspond to the parameters received during step 340, the process proceeds to step 390 where the process terminates. However, if the parameters received during step 340 do not match those that were received at step 320, the process continues to step 360 where the TSP places a call to a mobile device corresponding to the parameters received at step 340. At step 360, if the TSP is able to establish a connection with a subscriber device using the parameters received at step 340, the process continues to step 370 where the process updates the parameters stored in the database at step 300 with the parameters received from the carrier network operator at step 340 and the process proceeds to step 390 where the process terminates. However, if at step 360 the TSP is unable to establish a connection with a subscriber device with the parameters received from the carrier network operator at step 340, an error message containing details of the mismatched parameters is logged at step 380 and the process then proceeds to step 390 where the process terminates. In addition to logging, or storing, the error message at step 380, the error message may also be sent to another element of the communications center for further processing, or alternatively, to a specialized technical advisor for further analysis and for facilitating corrective measures.

Figure 4:
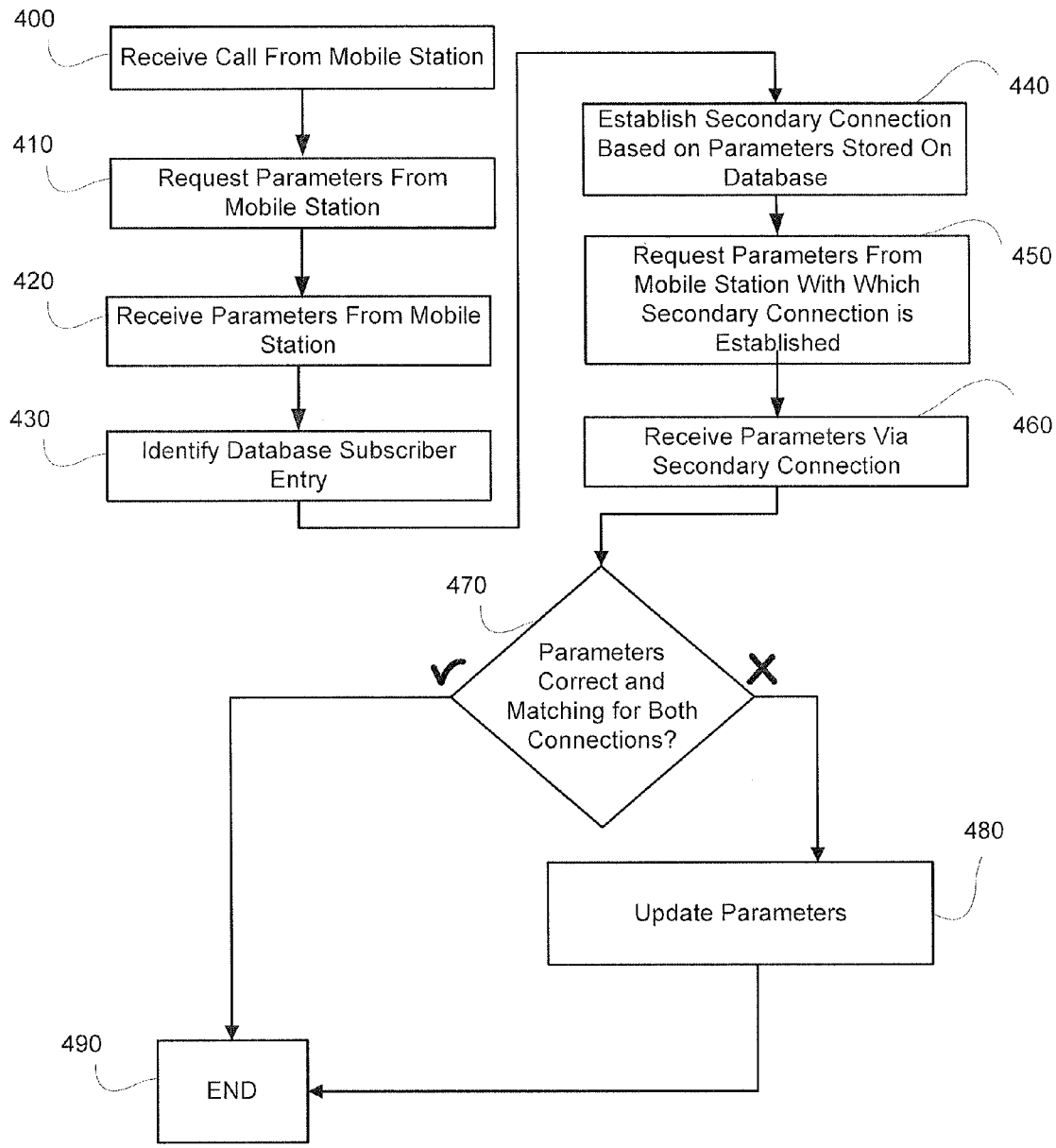
FIG. 4 is a flowchart illustrating an alternative process involving a secondary connection with a mobile station for confirming the accuracy and consistency of parameters stored on one or more databases and at a mobile station.

FIG. 4 is a flowchart summarizing an alternative method for maintaining subscriber contact information. During step 400, a call from a mobile station is received. The call may be received by a TSP at a communications center such as that exemplified by element 108 of FIG. 1 or element 241 of FIG. 2. During step 410, parameters such as the TSTID, MDN, MSISDN, IMEI, IMSI, MIN, MEID, ISN, ICCID, SSID, MAC address, and IP address are requested from the mobile station making the incoming call. During step 420, the parameters are received from the mobile station. During step 430, a subscriber entry corresponding to the parameters received during step 420 is identified. During step 440, a secondary connection is established with the device corresponding to the database entry identified during step 430. For example, the secondary connection may be a data call or may be established via SMS. During step 450, the parameters, such as the TSTID, MDN, MSISDN, IMEI, IMSI, MIN, MEID, ISN, ICCID, SSID, MAC address, and IP address, are requested from the mobile station with which the secondary connection has been established. During step 460, parameters corresponding to the mobile station with which the secondary connection has been established are received. During step 470, the parameters obtained from the calling mobile station and the parameters obtained from the secondary connection are compared. If the parameters obtained from each connection are identical, the process proceeds to step 490 where it terminates. However, if the parameters obtained from the initial call differ from those obtained from the secondary connection, the process proceeds to step 480 where the parameters stored on the database are updated. Additionally, step 480 may involve storing, or logging, an error message that contains the details of the differences in the parameters obtained from the initial call and those obtained from the secondary connection and may further involve transmitting the error message to another element of the communications center or to a specialized technical advisor in order to facilitate further analysis of the parameter mismatch. The process subsequently proceeds to step 490 where it terminates.

Figure 5:
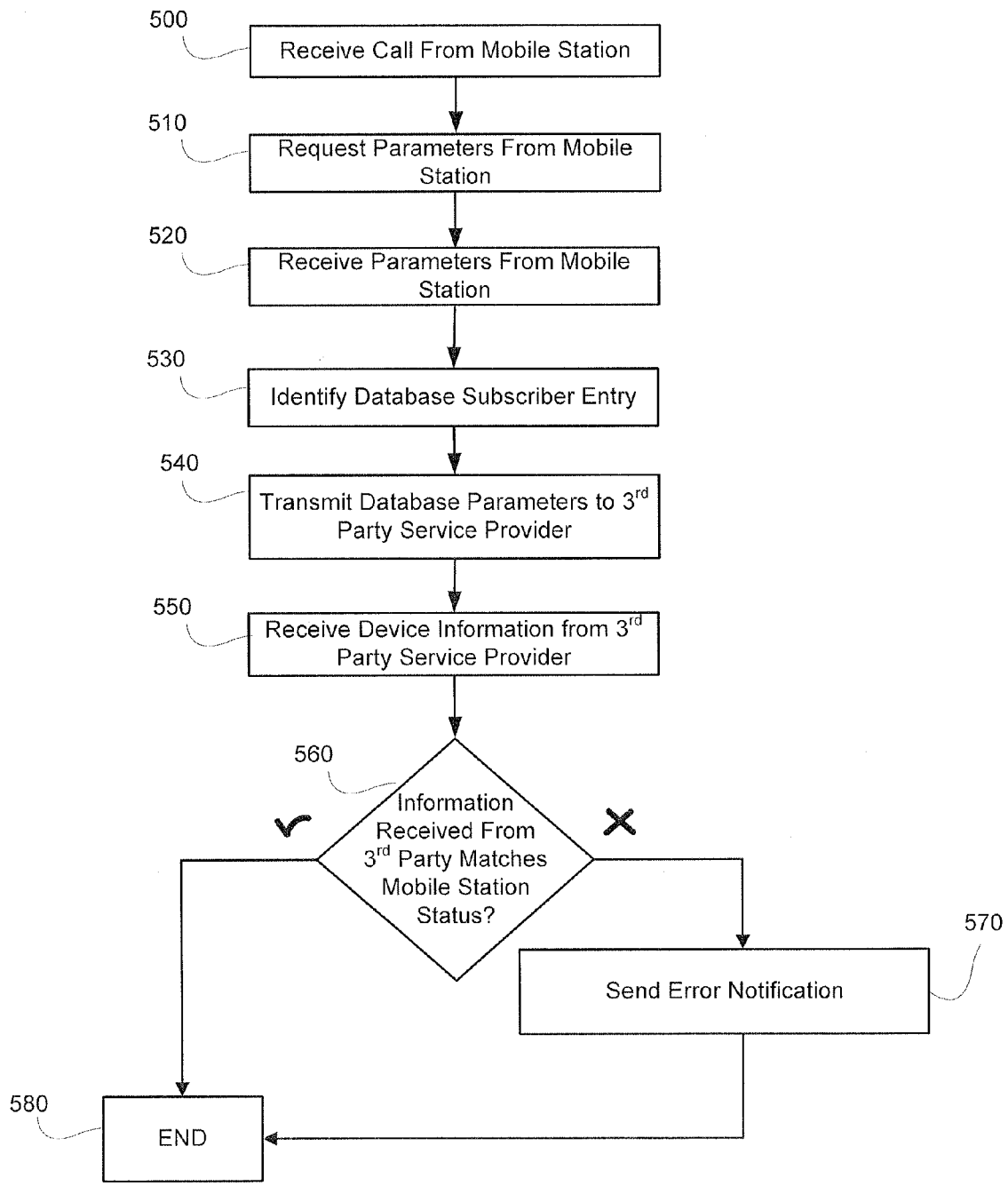
FIG. 5 is a flowchart illustrating an alternative process utilizing a third party service provider for confirming the accuracy and consistency of parameters stored on one or more databases and at a mobile station.

FIG. 5 is a flowchart summarizing another exemplary method for maintaining telematics subscriber contact information. During step 500 a call is received from a mobile station. During step 510 a request for the TSTID and other parameters is sent to the mobile station. During step 520, the TSTID and other parameters are received from the mobile station. During step 530, the information received during step 520 is used to identify an entry in a database corresponding to a subscriber. During step 540, information stored in the subscriber entry is transmitted to a third party service provider. For example, information may be transferred to the carrier operator or a provisioning platform such as Jasper. During step 550, information pertaining to the status and/or activity of the mobile station, or characteristics of the mobile station, identified by the third party service provider is received. Characteristics of the mobile station provided by the third party service provider may include one or more of the mobile station's connectivity status, the length and duration of any connection in which the mobile station is participating, the identity of other devices participating in a connection in which the mobile station is also participating, and whether or not the mobile station is presently powered on. During step 560, it is determined whether or not the information provided by the third party indicates that the mobile station for which information was requested has an identical status as that of the mobile station from which the incoming call was received during step 500. For example, it could be determined that the mobile station for which information was requested from the third party has an active call with identical characteristics as the active call with the mobile device from which the incoming call during step 500 was received. If the status of the mobile device from which the incoming call was received during step 500 is identical to that of the device for which information was requested from the third party, the process proceeds to step 580 where it terminates. However, if the status of each device is different, then the process proceeds to step 570 where an error notification containing the status of each device is logged. In addition to logging, or storing, the error message at step 570, the error message may also be sent to another element of the communications center for further processing, or alternatively, to a specialized technical advisor for further analysis and for facilitating corrective measures.

It will thus be appreciated that the described system and method allow for reliable verification of mobile station identifiers stored at multiple locations. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for ensuring accuracy and consistency of mobile station provisioning and activation parameters stored at multiple locations, where the parameters correspond to devices through which telematics services are provided, the method comprising:

establishing, with a mobile station, a first connection;

requesting, via the first connection, a first set of network-independent hardware identification parameters stored at the mobile station;

receiving the first set of network-independent hardware identification parameters via the first connection;

identifying a subscriber account corresponding to at least one network-independent identification parameter in the first set of network-independent hardware identification parameters received from the mobile station;

requesting, via a second connection, hardware status or identification information pertaining to a mobile station corresponding to a network assigned parameter, the network assigned parameter being associated with the subscriber account;

receiving the hardware status or identification information pertaining to the mobile station corresponding to the network assigned parameter;

determining whether the first set of network-independent hardware identification parameters correspond to the hardware status or identification information pertaining to the mobile station corresponding to the network-assigned parameter; and if one or more of the first set of network-independent hardware identification parameters do not correspond to the hardware status or identification information pertaining to the mobile station corresponding to the network assigned parameter, updating the subscriber account.

2. The method of claim 1, wherein establishing, with the mobile station, the first connection includes one of the group consisting of: receiving a call from the mobile station and placing a call to the mobile station.

3. The method of claim 1, wherein requesting, via the first connection, the first set of network-independent hardware identification parameters stored at the mobile station comprises requesting the mobile station to transmit at least one of the group consisting of: a telematics station identifier (TSTID), a mobile device number (MDN), an international mobile equipment identity (IMEI), an international mobile subscriber identity (IMSI), an electronic serial number (ESN), and a mobile equipment identifier (MEID).

4. The method of claim 1, wherein requesting, via the second connection, hardware status or identification information pertaining to a mobile station corresponding to the network assigned parameter comprises requesting a second set of network-independent identification parameters that are associated, by a second source, with the network assigned parameter and that include at least one of the group consisting of: a telematics station identifier (TSTID), a mobile device number (MDN), an international mobile equipment identity (IMEI), an international mobile subscriber identity (IMSI), an electronic serial number (ESN), and a mobile equipment identifier (MEID).

5. The method of claim 1, wherein identifying a subscriber account corresponding to at least one network-independent identification parameter in the first set of network-independent hardware identification parameters comprises identifying a subscriber account corresponding to one of the group consisting of: a telematics station identifier (TSTID) and a mobile device number (MDN).

6. The method of claim 4, wherein requesting the second set of network-independent identification parameters comprises:
establishing an API call with a carrier network operator; and
requesting the second set of network-independent identification parameters from the carrier network operator.

7. The method of claim 4, wherein requesting the second set of network-independent identification parameters comprises:
establishing a connection with a mobile station corresponding to the network assigned parameter associated with the subscriber account; and
requesting the second set of network-independent identification parameters from the mobile station corresponding to the network assigned parameter associated with the subscriber account.

8. The method of claim 1, wherein requesting, via the second connection, hardware status or identification information pertaining to the mobile station corresponding to a network assigned parameter, the network assigned parameter being associated with the subscriber account comprises:
establishing a connection with a third party service provider; and
requesting the third party service provider provide characteristics of the mobile device corresponding to the network assigned parameter associated with the subscriber account.

9. The method of claim 8, wherein the characteristics of the mobile device having the network assigned parameter being associated with the subscriber account, include one or more of the group consisting of: connectivity status, length and duration of active connections between the mobile device and other network elements, identities of other devices connected to the mobile device, and powered on status.

10. The method of claim 1, wherein:
receiving the hardware status or identification information pertaining to the mobile station corresponding to the network assigned parameter comprises receiving an indication that a connection could not be established with the mobile station linked to the subscriber account; and
updating the subscriber account comprises storing an error message indicating that the parameters currently stored at the subscriber account are incorrect.

11. A non-transitory computer readable medium configured to ensure accuracy and consistency of mobile station provisioning and activation parameters stored at multiple locations, where the parameters correspond to devices through which telematics services are provided, the computer readable medium having stored thereon computer executable instructions for:
establishing, with a mobile station, a first connection;
requesting, via the first connection, a first set of network-independent hardware identification parameters stored at the mobile station;
receiving the first set of network-independent hardware identification parameters via the first connection;
identifying a subscriber account corresponding to at least one network-independent identification parameter in the first set of network-independent hardware identification parameters received from the mobile station;
requesting, via a second connection, hardware status or identification information pertaining to a mobile station corresponding to a network assigned parameter, the network assigned parameter being associated with the subscriber account;
receiving the hardware status or identification information pertaining to the mobile station corresponding to the network assigned parameter;
determining whether the first set of network-independent hardware identification parameters correspond to the hardware status or identification information pertaining to the mobile station corresponding to the network-assigned parameter; and
if one or more of the first set of network-independent hardware identification parameters do not correspond to the hardware status or identification information pertaining to the mobile station corresponding to the network assigned parameter, updating the subscriber account.

12. The non-transitory computer readable medium of claim 11, wherein establishing, with the mobile station, the first connection includes one of the group consisting of: receiving a call from the mobile station and placing a call to the mobile station.

13. The non-transitory computer readable medium of claim 11, wherein requesting, via the first connection, the first set of network-independent hardware identification parameters stored at the mobile station comprises requesting the mobile station to transmit at least one of the group consisting of: a telematics station identifier (TSTID), a mobile device number (MDN), an international mobile equipment identity (IMEI), an international mobile subscriber identity (IMSI), an electronic serial number (ESN), and a mobile equipment identifier (MEID).

14. The non-transitory computer readable medium of claim 11, wherein requesting, via the second connection, hardware status or identification information pertaining to the mobile station corresponding to the network assigned parameter comprises requesting a second set of network-independent identification parameters that are associated, by a second source, with the network assigned parameter and that include at least one of the group consisting of: a telematics station identifier (TSTID), a mobile device number (MDN), an international mobile equipment identity (IMEI), an international mobile subscriber identity (IMSI), an electronic serial number (ESN), and a mobile equipment identifier (MEID).

15. The non-transitory computer readable medium of claim 11, wherein identifying ache subscriber account corresponding to at least one network-independent identification parameter in the first set of network-independent hardware identification parameters comprises identifying a subscriber account corresponding to one of the group consisting of: a telematics station identifier (TSTID) and a mobile device number (MDN).

16. The non-transitory computer readable medium of claim 14, wherein requesting the second set of network-independent identification parameters comprises:
    establishing an API call with a carrier network operator; and
    requesting the second set of network-independent identification parameters from the carrier network operator.

17. The non-transitory computer readable medium of claim 14, wherein requesting the second set of network-independent identification parameters comprises:
    establishing a connection with a mobile station corresponding to the network assigned parameter associated with the subscriber account; and
    requesting the second set of network-independent identification parameters from the mobile station corresponding to the network assigned parameter associated with the subscriber account.

18. The non-transitory computer readable medium of claim 11, wherein requesting, via the second connection, hardware status or identification information pertaining to the mobile station corresponding to a network assigned parameter, the network assigned parameter being associated with the subscriber account comprises:
    establishing a connection with a third party service provider; and
    requesting the third party service provider provide characteristics of the mobile device corresponding to the network assigned parameter associated with the subscriber account.

19. The non-transitory computer readable medium of claim 18, wherein the characteristics of the mobile device having the network assigned parameter being associated with the subscriber account, include one or more of the group consisting of: connectivity status, length and duration of active connections between the mobile device and other network elements, identities of other devices connected to the mobile device, and powered on status.

20. A system for ensuring accuracy and consistency of mobile station provisioning and activation parameters stored at multiple locations, where the parameters correspond to devices through which telematics services are provided, the system comprising:
    a database configured to store subscriber account information; and
    a processor configured with computer executable instructions for:
    establishing, with a mobile station, a first connection;
    requesting, via the first connection, a first set of network-independent hardware identification parameters stored at the mobile station;
    receiving the first set of network-independent hardware identification parameters via the first connection;
    identifying a subscriber account corresponding to at least one network-independent identification parameter in the first set of network-independent hardware identification parameters received from the mobile station;
    requesting, via a second connection, hardware status or identification information pertaining to a mobile station corresponding to a network assigned parameter, the network assigned parameter being associated with the subscriber account;
    receiving the hardware status or identification information pertaining to the mobile station corresponding to the network assigned parameter;
    determining whether the first set of network-independent hardware identification parameters correspond to the hardware status or identification information pertaining to the mobile station corresponding to the network-assigned parameter; and
    if one or more of the first set of network-independent hardware identification parameters do not correspond to the hardware status or identification information pertaining to the mobile station corresponding to the network assigned parameter, updating the subscriber account.

* * * * *